(12) United States Patent
Valeva et al.

(10) Patent No.: US 10,331,504 B2
(45) Date of Patent: Jun. 25, 2019

(54) METHOD AND SYSTEM FOR EXTENDING APPLICATION PROGRAMMING INTERFACES

(71) Applicant: VMware, Inc., Palo Alto, CA (US)

(72) Inventors: Mariana Valeva, Sofia (BG); Kiril Karaatanassov, Sofia (BG)

(73) Assignee: VMware, Inc., Palo Alto, CA (US)

( * ) Notice: Subject to any disclaimer, the term of this patent is extended or adjusted under 35 U.S.C. 154(b) by 1290 days.

(21) Appl. No.: 13/930,275

(22) Filed: Jun. 28, 2013

(65) Prior Publication Data
US 2015/0007199 A1 Jan. 1, 2015

(51) Int. Cl.
*G06F 9/50* (2006.01)
*G06F 9/54* (2006.01)

(52) U.S. Cl.
CPC .................................. *G06F 9/546* (2013.01)

(58) Field of Classification Search
None
See application file for complete search history.

(56) References Cited

U.S. PATENT DOCUMENTS

| | | | |
|---|---|---|---|
| 2006/0230023 A1* | 10/2006 | Erickson et al. | 707/3 |
| 2007/0233580 A1* | 10/2007 | Pike et al. | 705/26 |
| 2008/0086369 A1* | 4/2008 | Kiat et al. | 705/14 |
| 2009/0187573 A1* | 7/2009 | Johnston et al. | 707/10 |
| 2010/0070561 A1* | 3/2010 | Dhoolia et al. | 709/203 |
| 2010/0142516 A1* | 6/2010 | Lawson et al. | 370/352 |
| 2011/0321032 A1* | 12/2011 | Ciccone | 717/171 |

* cited by examiner

*Primary Examiner* — Shih-Wei Kraft

(57) ABSTRACT

The current document discloses methods and systems for providing extensions to web-services APIs, including RESTful APIs, and to extend other types of interfaces that define client/server-based distributed computing systems. The disclosed methods and systems are facilitated by, and include, respectively, a link registry within one or more server computers, or that is accessible to the one or more server computers, that together provide a web service accessed through an API. The link registry stores link-registry entries, each of which specifies one or more links to be added to response messages associated with a particular resource. The link registry, like any resource, is associated with a set of verbs, or functions, that allow entries to be added to, and removed from, the link registry and that allow entries to be modified. The link registry can be used both by server-resident functionality as well as by functionality within external computers to extend an existing web service or API.

11 Claims, 18 Drawing Sheets

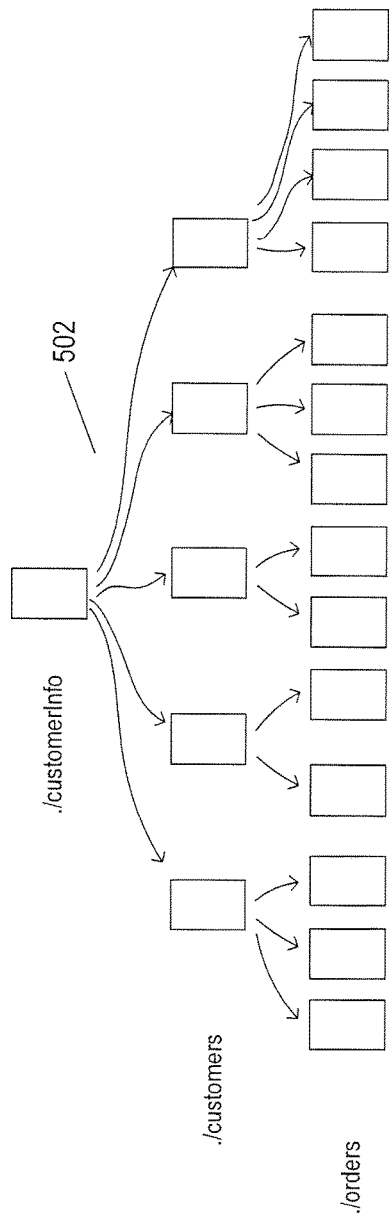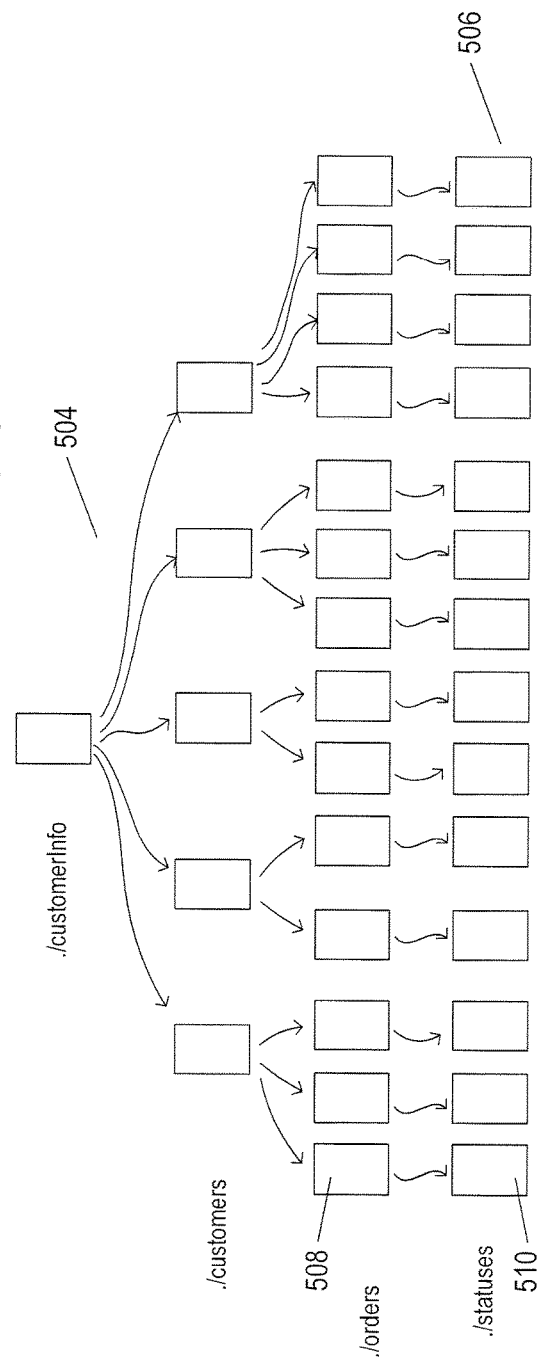

Link Registry

```
{
    "Resource URI" : "http://www.acme.com/custmerInfo/customers",
    "numKvp" : "3",
    "kvp" : {
            "applyTo" : "terminal",
            "Representation.data.city" : "Des Moines",
            "Representation.data.state" : "Iowa",
            }
    "numLinks" : "2",
    "links" : {
            { "rel" : "related",
              "href" : "http://www.acme.com/customerInfo/trial Des Moines Group",
              "type" : "text/html"
            }
          }
}
```

FIG. 9

METHOD AND SYSTEM FOR EXTENDING APPLICATION PROGRAMMING INTERFACES

TECHNICAL FIELD

The current document is directed to application programming interfaces that define services provided by server computers to client computers and, in particular, to a method and system that facilitates extension of these application programming interfaces after they are initially deployed.

BACKGROUND

Application programming interfaces ("APIs") generally define functional or operation-based interfaces between systems or services and application programs that access the systems or services through the APIs. An API is often a collection of function declarations or a list of operations that specify what type of operations are provided by a system or service and how those operations are invoked from an application program.

There are many different types of APIs that provide interfaces to many different types of systems and services. The current document is directed to APIs for web services and other services provided by server computers, generally through the Internet, to remote client computers. One type of web-service API that has emerged as the prominent type of API for web services is referred to as a RESTful API. The acronym "REST" stands for "Representational State Transfer." REST specifies a general style or architecture for client/server-based distributed computer systems. RESTful APIs are based on the hypertext transfer protocol ("HTTP") and uniform resource identifiers ("URIs"). The HTTP protocol is an application-layer protocol for client/server-based exchange of information within distributed systems, and defines a small set of operations that allow client computers to request representations of various resources managed by a server, each identified by a unique URI, create new resources, update resources, and delete resources. Additional HTTP methods provide additional functionalities related to messages transmitted between clients and servers. The HTTP methods are referred to as "verbs," meaning that they are the functions, operations, or methods of a RESTful API that represent actions. These verbs can be thought of as operating on resources, each identified by a unique URI, managed by a server. Often, the resources are hierarchically organized, with the hierarchical organization reflected in the structure of the URIs. A resource can be any type of entity that can be described by digitally encoded data.

The REST architecture is essentially an encapsulation of a set of best practices and general guidelines for developing service APIs. These are, in turn, encapsulated in a set of six constraints, which include: (1) a uniform-interface constraint; (2) a stateless constraint; (3) a cacheable constraint; (4) a client-server constraint; (5) a layered-system constraint; and (6) a code-on-demand constraint. The uniform-interface constraint defines the interface between clients and servers and decouples client functionality from server functionality. This provides many advantages in large distributed systems. When functionalities are distributed across clients and servers, rather than localized either in clients or servers, implementation becomes more difficult and complex, and requires many different types of distributed-computing techniques that add complexity and computational overhead to the distributed system. Another aspect of the uniform-interface constraint is that the restful APIs are largely resource-based. Clients request information about resources, which is returned to clients by servers as resource representations, and may also request certain operations on resources, such as updating the representations of resources maintained by the server. The uniform-interface constraint also provides that messages passed between clients and servers are self-descriptive. For example, each request message transmitted by a client to a server includes sufficient information to describe how the message is processed by the server. Message bodies may be encoded in JavaScript Object Notation ("JSON") or extensible markup language ("XML"), both encoding systems for self-descriptive messages. Finally, the uniform-interface constraint specifies that links, essentially URIs, referred to as "hyperlinks," are embedded by servers into message bodies to facilitate navigation by clients through the API and resource-representation acquisition, as well as for other purposes.

A RESTful API is stateless. In other words, servers do not save state information for particular client computers across multiple resource requests. Instead, in a RESTful API, each request message contains sufficient information for a server to handle the request. As a consequence of this stateless architecture, when some type of context is maintained across multiple requests, it is the client computer's responsibility to maintain the context. This greatly simplifies server implementation.

The cacheable constraint specifies that response messages identify themselves as being cacheable or not cacheable, to facilitate caching of responses by client computers and various types of intermediate computers. Cacheable responses can be stored by client computers and intermediate computers to avoid the need for multiple client/server transactions that all involve a server returning the same resource representation in a response message.

The client-server constraint provides for separation of client-computer and server-computer responsibilities, which facilitates client and server implementations. Client computers are not concerned with data storage with respect to a service provided by a server computer, which facilitates the design and portability of client-computer code, while servers are not concerned with user interfaces for displaying resources to users or user-state information, which is the responsibility of client computers. By separating server and client functionality, complex implementations in which functionality is distributed across users and servers are avoided, as are the many complexities and overheads associated with such distributed functionalities.

The layered-system constraint facilitates the scalability and ability for load balancing of server functionality. The server that provides a service via a RESTful API may be a single server or a hierarchically organized collection of end servers and intermediary servers but, in both cases, the service is accessed in identical fashion by client computers, which remain unaware of the server-side implementation.

The optional code-on-demand constraint facilitates the extension and/or customization of service functionality by allowing servers to transfer executables, such as Java applets and client-side JavaScript scripts, to client computers. This and other features of RESTful APIs allow for RESTful apps to be dynamically extended and modified, even after initial deployment.

While REST is, in part, based on the premise that RESTful APIs can be extended, over time, to provide new and additional types of functionalities, REST does not specify how the extension of APIs can be implemented, other than providing for the return of hyperlinks, by servers, in response-message bodies as well as the return of executable code by servers to client computers. While these features of REST form a basis for API extensibility, designers and developers of web services face significant challenges and hurdles in developing and deploying practical extensible services and APIs.

SUMMARY

The current document discloses methods and systems for providing extensions to web-services APIs, including RESTful APIs, and to extend other types of interfaces that define client/server-based distributed computing systems. The disclosed methods and systems are facilitated by, and include, respectively, a link registry within one or more server computers, or that is accessible to the one or more server computers, that together provide a web service accessed through an API. The link registry stores link-registry entries, each of which specifies one or more links to be added to response messages associated with a particular resource. The link registry, like any resource, is associated with a set of verbs, or functions, that allow entries to be added to, and removed from, the link registry and that allow entries to be modified. The link registry can be used both by server-resident functionality as well as by functionality within external computers to extend an existing web service or API.

BRIEF DESCRIPTION OF THE DRAWINGS

FIGS. 5A-B illustrate extension of the simple RESTful API discussed above with reference to FIGS. 3 and 4A-B.

FIG. 9 illustrates a JSON encoding of a particular link-registry entry.

DETAILED DESCRIPTION OF EMBODIMENTS

The current document is directed to methods and systems for extending RESTful services and APIs. It should be noted, at the onset, that these methods and systems are directed to real, tangible, physical systems and methods carried out within physical systems, including client computers and server computers. Those familiar with modern science and technology well appreciate that, in modern computer systems and other processor-controlled devices and systems, the control components are often fully or partially implemented as sequences of computer instructions that are stored in one or more electronic memories and, in many cases, also in one or more mass-storage devices, and which are executed by one or more processors. As a result of their execution, a processor-controlled device or system carries out various operations, generally at many different levels within the device or system, according to control logic implemented in the stored and executed computer instructions. Computer-instruction-implemented control components of modern processor-controlled devices and systems are as tangible and physical as any other component of the system, including power supplies, cooling fans, electronic memories and processors, and other such physical components.

Figure 1:
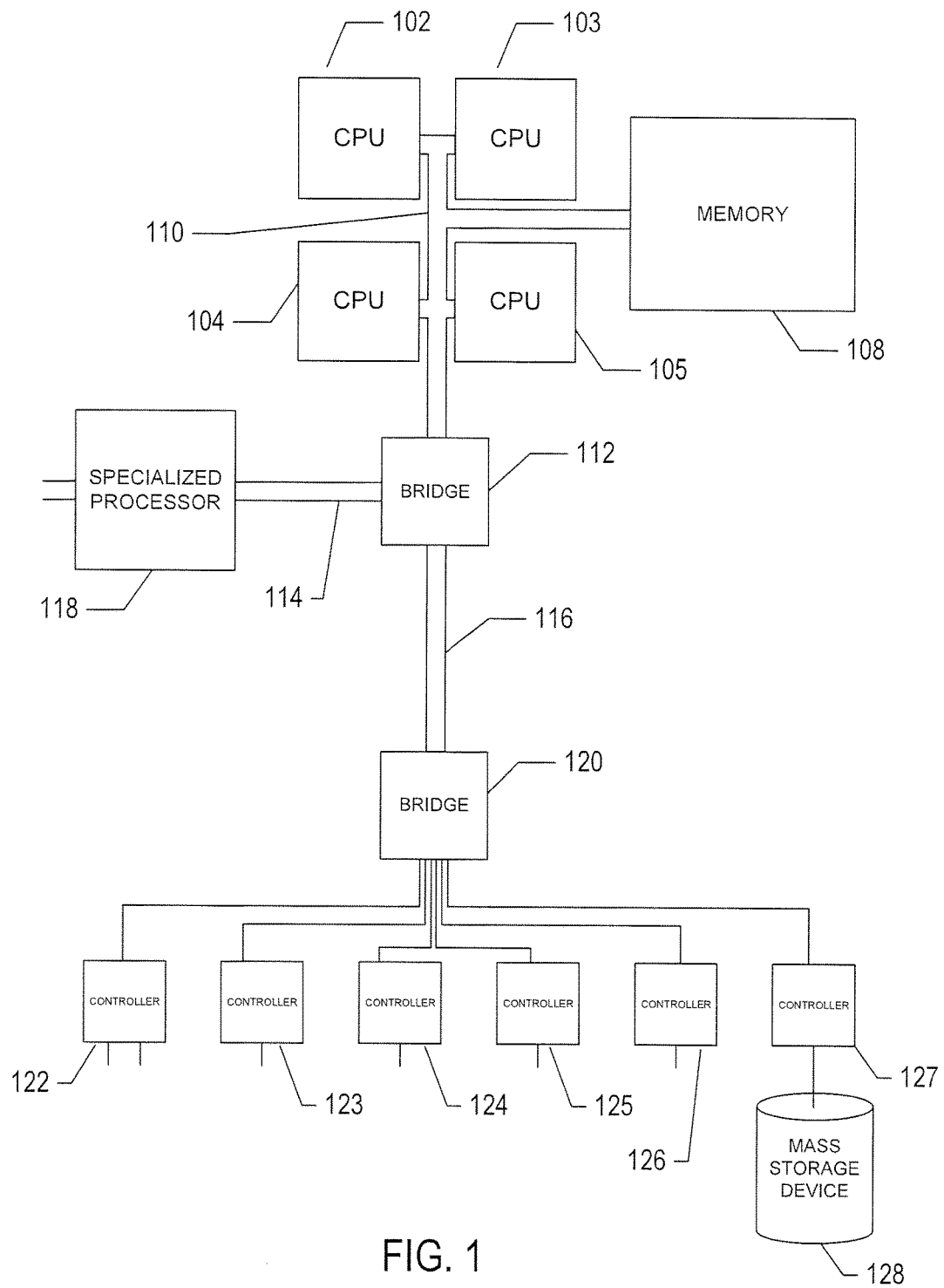
FIG. 1 provides a general architectural overview of a computer system, such as a server computer or personal computer.

FIG. 1 provides a general architectural overview of a computer system, such as a server computer or personal computer. The computer system contains one or multiple central processing units ("CPUs") 102-105, one or more electronic memories 108 interconnected with the CPUs by a CPU/memory-subsystem bus 110 or multiple busses, a first bridge 112 that interconnects the CPU/memory-subsystem bus 110 with additional busses 114 and 116, or other types of high-speed interconnection media, including multiple, high-speed serial interconnects. These busses or serial interconnections, in turn, connect the CPUs and memory with specialized processors, such as a graphics processor 118, and with one or more additional bridges 120, which are interconnected with high-speed serial links or with multiple controllers 122-127, such as controller 127, that provide access to various different types of mass-storage devices 128, electronic displays, input devices, and other such components, subcomponents, and computational resources.

Figure 2:
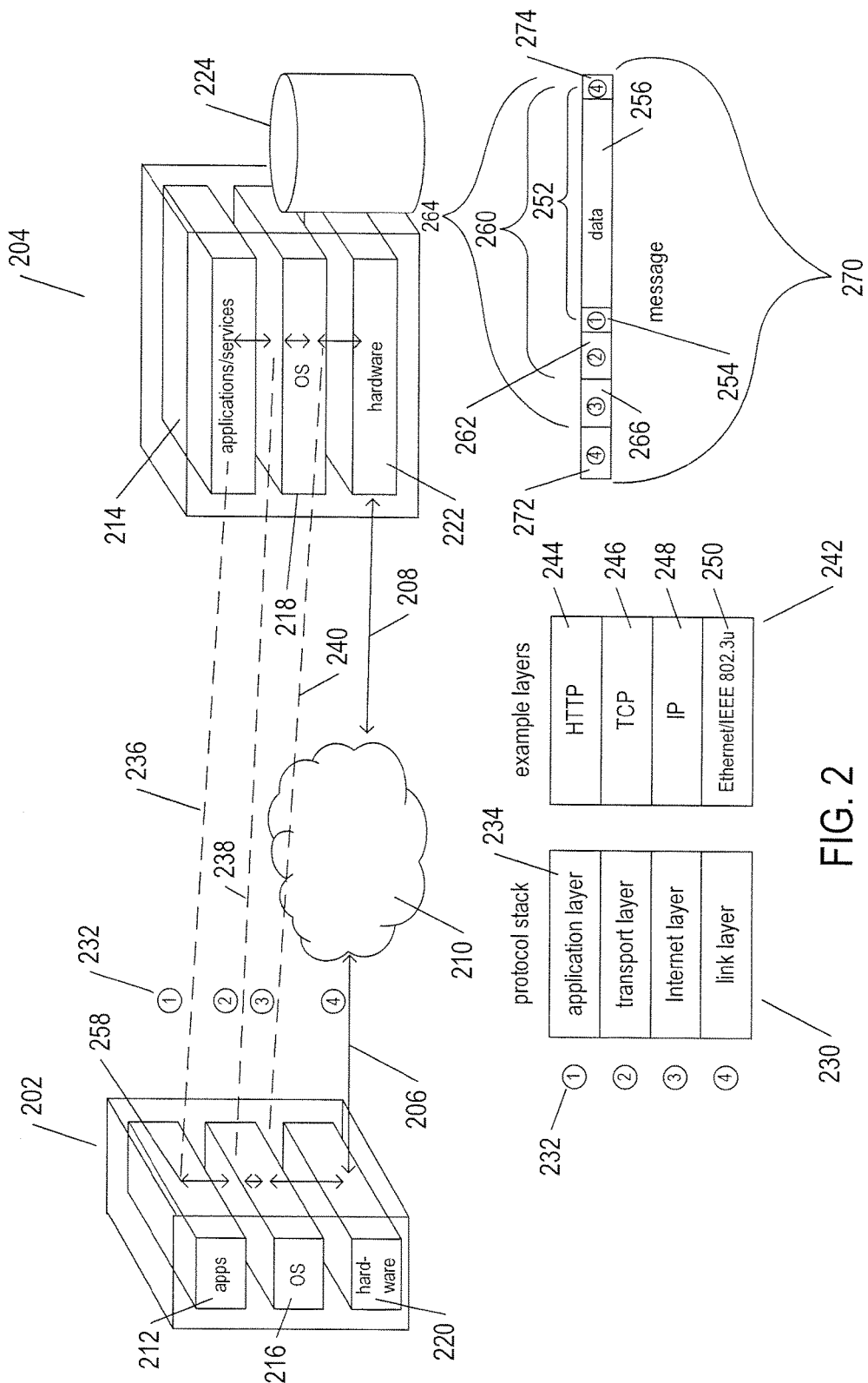
FIG. 2 illustrates electronic communications between a client and server computer.

FIG. 2 illustrates electronic communications between a client and server computer. The following discussion of FIG. 2 provides an overview of electronic communications. This is, however, a very large and complex subject area, a full discussion of which would likely run for many hundreds or thousands of pages. The following overview is provided as a basis for discussing the REST architecture, with reference to subsequent figures. In FIG. 2, a client computer 202 is shown to be interconnected with a server computer 204 via local communication links 206 and 208 and a complex distributed intermediary communications system 210, such as the Internet. This complex communications system may include a large number of individual computer systems and many types of electronic communications media, including wide-area networks, public switched telephone networks, wireless communications, satellite communications, and many other types of electronics-communications systems and intermediate computer systems, routers, bridges, and other device and system components. Both the server and client computers are shown to include three basic internal layers including an applications layer 212 in the client computer and a corresponding applications and services layer 214 in the server computer, an operating-system layer 216 and 218, and a hardware layer 220 and 222. The server computer 204 is additionally associated with an internal, peripheral, or remote data-storage subsystem 224. The hardware layers 220 and 222 may include the components discussed above with reference to FIG. 1 as well as many additional hardware components and subsystems, such as power supplies, cooling fans, switches, auxiliary processors, and many other mechanical, electrical, electromechanical, and electro-optical-mechanical components. The operating system 216 and 218 represents the general control system of both a client computer 202 and a server computer 204. The operating system interfaces to the hardware layer through a set of registers that, under processor control, are used for transferring data, including commands and stored information, between the operating system and various hardware components. The operating system also provides a complex execution environment in which various application programs, including database management systems, web browsers, web services, and other application programs execute. In many cases, modern computer systems employ an additional layer between the operating system and the hardware layer, referred to as a "virtualization layer," that interacts directly with the hardware and provides a virtual-hardware-execution environment for one or more operating systems.

Client systems may include any of many types of processor-controlled devices, including tablet computers, laptop computers, mobile smart phones, and other such processor-controlled devices. These various types of clients may include only a subset of the components included in a desktop personal component as well components not generally included in desktop personal computers.

Electronic communications between computer systems generally comprises packets of information, referred to as datagrams, transferred from client computers to server computers and from server computers to client computers. In many cases, the communications between computer systems is commonly viewed from the relatively high level of an application program which uses an application-layer protocol for information transfer. However, the application-layer protocol is implemented on top of additional layers, including a transport layer, Internet layer, and link layer. These layers are commonly implemented at different levels within computer systems. Each layer is associated with a protocol for data transfer between corresponding layers of computer systems. These layers of protocols are commonly referred to as a "protocol stack." In FIG. 2, a representation of a common protocol stack 230 is shown below the interconnected server and client computers 204 and 202. The layers are associated with layer numbers, such as layer number "1" 232 associated with the application layer 234. These same layer numbers are used in the depiction of the interconnection of the client computer 202 with the server computer 204, such as layer number "1" 232 associated with a horizontal dashed line 236 that represents interconnection of the application layer 212 of the client computer with the applications/services layer 214 of the server computer through an application-layer protocol. A dashed line 236 represents interconnection via the application-layer protocol in FIG. 2, because this interconnection is logical, rather than physical. Dashed-line 238 represents the logical interconnection of the operating-system layers of the client and server computers via a transport layer. Dashed line 240 represents the logical interconnection of the operating systems of the two computer systems via an Internet-layer protocol. Finally, links 206 and 208 and cloud 210 together represent the physical communications media and components that physically transfer data from the client computer to the server computer and from the server computer to the client computer. These physical communications components and media transfer data according to a link-layer protocol. In FIG. 2, a second table 242 aligned with the table 230 that illustrates the protocol stack includes example protocols that may be used for each of the different protocol layers. The hypertext transfer protocol ("HTTP") may be used as the application-layer protocol 244, the transmission control protocol ("TCP") 246 may be used as the transport-layer protocol, the Internet protocol 248 ("IP") may be used as the Internet-layer protocol, and, in the case of a computer system interconnected through a local Ethernet to the Internet, the Ethernet/IEEE 802.3u protocol 250 may be used for transmitting and receiving information from the computer system to the complex communications components of the Internet. Within cloud 210, which represents the Internet, many additional types of protocols may be used for transferring the data between the client computer and server computer.

Consider the sending of a message, via the HTTP protocol, from the client computer to the server computer. An application program generally makes a system call to the operating system and includes, in the system call, an indication of the recipient to whom the data is to be sent as well as a reference to a buffer that contains the data. The data and other information are packaged together into one or more HTTP datagrams, such as datagram 252. The datagram may generally include a header 254 as well as the data 256, encoded as a sequence of bytes within a block of memory. The header 254 is generally a record composed of multiple byte-encoded fields. The call by the application program to an application-layer system call is represented in FIG. 2 by solid vertical arrow 258. The operating system employs a transport-layer protocol, such as TCP, to transfer one or more application-layer datagrams that together represent an application-layer message. In general, when the application-layer message exceeds some threshold number of bytes, the message is sent as two or more transport-layer messages. Each of the transport-layer messages 260 includes a transport-layer-message header 262 and an application-layer datagram 252. The transport-layer header includes, among other things, sequence numbers that allow a series of application-layer datagrams to be reassembled into a single application-layer message. The transport-layer protocol is responsible for end-to-end message transfer independent of the underlying network and other communications subsystems, and is additionally concerned with error control, segmentation, as discussed above, flow control, congestion control, application addressing, and other aspects of reliable end-to-end message transfer. The transport-layer datagrams are then forwarded to the Internet layer via system calls within the operating system and are embedded within Internet-layer datagrams 264, each including an Internet-layer header 266 and a transport-layer datagram. The Internet layer of the protocol stack is concerned with sending datagrams across the potentially many different communications media and subsystems that together comprise the Internet. This involves routing of messages through the complex communications systems to the intended destination. The Internet layer is concerned with assigning unique addresses, known as "IP addresses," to both the sending computer and the destination computer for a message and routing the message through the Internet to the destination computer. Internet-layer datagrams are finally transferred, by the operating system, to communications hardware, such as a network-interface controller ("NIC") which embeds the Internet-layer datagram 264 into a link-layer datagram 270 that includes a link-layer header 272 and generally includes a number of additional bytes 274 appended to the end of the Internet-layer datagram. The link-layer header includes collision-control and error-control information as well as local-network addresses. The link-layer packet or datagram 270 is a sequence of bytes that includes information introduced by each of the layers of the protocol stack as well as the actual data that is transferred from the source computer to the destination computer according to the application-layer protocol.

Figure 3:
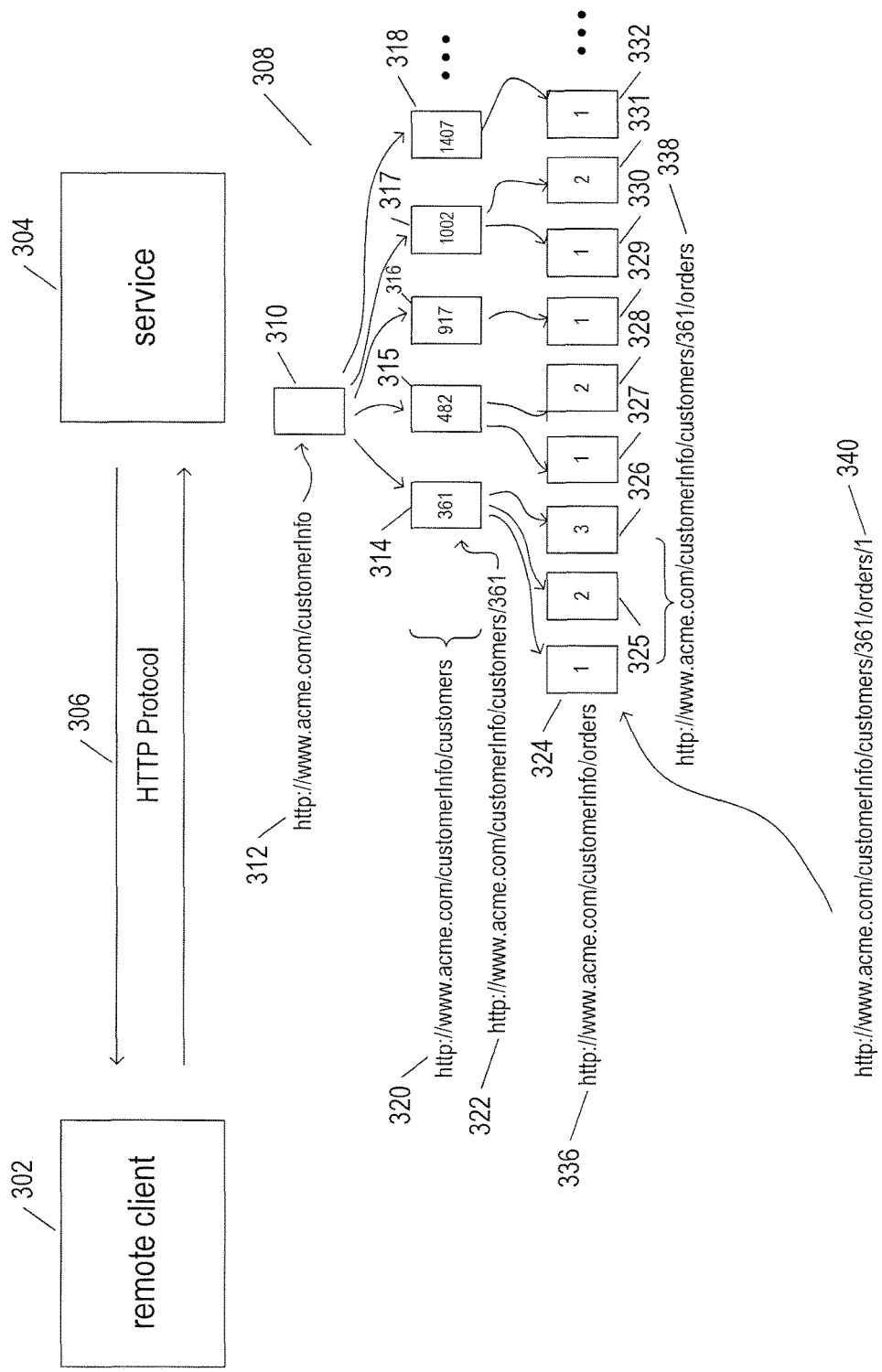
FIG. 3 illustrates the role of resources in RESTful *APIs*.

Next, the RESTful approach to web-service APIs is described, beginning with FIG. 3. FIG. 3 illustrates the role of resources in RESTful APIs. In FIG. 3, and in subsequent figures, a remote client 302 is shown to be interconnected and communicating with a service provided by one or more service computers 304 via the HTTP protocol 306. Many RESTful APIs are based on the HTTP protocol. Thus, the focus is on the application layer in the following discussion. However, as discussed above with reference to FIG. 2, the remote client 302 and service provided by one or more server computers 304 are, in fact, physical systems with application, operating-system, and hardware layers that are interconnected with various types of communications media and communications subsystems, with the HTTP protocol the highest-level layer in a protocol stack implemented in the application, operating-system, and hardware layers of client computers and server computers. The service may be provided by one or more server computers, as discussed above in a preceding section. As one example, a number of servers may be hierarchically organized as various levels of intermediary servers and end-point servers. However, the entire collection of servers that together provide a service are addressed by a domain name included in a URI, as further discussed below. A RESTful API is based on a small set of verbs, or operations, provided by the HTTP protocol and on resources, each uniquely identified by a corresponding URI. Resources are logical entities, information about which is stored on one or more servers that together comprise a domain. URIs are the unique names for resources. A resource about which information is stored on a server that is connected to the Internet has a unique URI that allows that information to be accessed by any client computer also connected to the Internet with proper authorization and privileges. URIs are thus globally unique identifiers, and can be used to specify resources on server computers throughout the world. A resource may be any logical entity, including people, digitally encoded documents, organizations, and other such entities that can be described and characterized by digitally encoded information. A resource is thus a logical entity. Digitally encoded information that describes the resource and that can be accessed by a client computer from a server computer is referred to as a "representation" of the corresponding resource. As one example, when a resource is a web page, the representation of the resource may be a hypertext markup language ("HTML") encoding of the resource. As another example, when the resource is an employee of a company, the representation of the resource may be one or more records, each containing one or more fields, that store information characterizing the employee, such as the employee's name, address, phone number, job title, employment history, and other such information.

In the example shown in FIG. 3, the web server 304 provides a RESTful API based on the HTTP protocol 306 and a hierarchically organized set of resources 308 that allow clients of the service to access information about the customers and orders placed by customers of the Acme Company. This service may be provided by the Acme Company itself or by a third-party information provider. All of the customer and order information is collectively represented by a customer information resource 310 associated with the URI "http://www.acme.com/customerInfo" 312. As discussed further, below, this single URI and the HTTP protocol together provide sufficient information for a remote client computer to access any of the particular types of customer and order information stored and distributed by the service 304. A customer information resource 310 represents a large number of subordinate resources. These subordinate resources include, for each of the customers of the Acme Company, a customer resource, such as customer resource 314. All of the customer resources 314-318 are collectively named or specified by the single URI "http://www.acme.com/customerInfo/customers" 320. Individual customer resources, such as customer resource 314, are associated with customer-identifier numbers and are each separately addressable by customer-resource-specific URIs, such as URI "http://www.acme.com/customerInfo/customers/361" 322 which includes the customer identifier "361" for the customer represented by customer resource 314. Each customer may be logically associated with one or more orders. For example, the customer represented by customer resource 314 is associated with three different orders 324-326, each represented by an order resource. All of the orders 324-332 are collectively specified or named by a single URI "http://www.acme.com/customerInfo/orders" 336. All of the orders associated with the customer represented by resource 314, orders represented by order resources 324-326, can be collectively specified by the URI "http://www.acme.com/customerInfo/customers/361/orders" 338. A particular order, such as the order represented by order resource 324, may be specified by a unique URI associated with that order, such as URI "http://www.acme.com/customerInfo/customers/361/orders/1" 340, where the final "1" is an order number that specifies a particular order within the set of orders corresponding to the particular customer identified by the customer identifier "361."

In one sense, the URIs bear similarity to path names to files in file directories provided by computer operating systems. However, it should be appreciated that resources, unlike files, are logical entities rather than physical entities, such as the set of stored bytes that together compose a file within a computer system. When a file is accessed through a path name, a copy of a sequence of bytes that are stored in a memory or mass-storage device as a portion of that file are transferred to an accessing entity. By contrast, when a resource is accessed through a URI, a server computer returns a digitally encoded representation of the resource, rather than a copy of the resource. For example, when the resource is a human being, the service accessed via a URI specifying the human being may return alphanumeric encodings of various characteristics of the human being, a digitally encoded photograph or photographs, and other such information. Unlike the case of a file accessed through a path name, the representation of a resource is not a copy of the resource, but is instead some type of digitally encoded information with respect to the resource.

In the example RESTful API illustrated in FIG. 3, a client computer can use the verbs, or operations, of the HTTP protocol and the top-level URI 312 to navigate the entire hierarchy of resources 308 in order to obtain information about particular customers and about the orders that have been placed by particular customers.

FIGS. 4A-D illustrate four basic verbs, or operations, provided by the HTTP application-layer protocol used in RESTful applications. RESTful applications are client/server protocols in which a client issues an HTTP request message to a service or server and the service or server responds by returning a corresponding HTTP response message. FIGS. 4A-D use the illustration conventions discussed above with reference to FIG. 3 with regard to the client, service, and HTTP protocol. For simplicity and clarity of illustration, in each of these figures, a top portion illustrates the request and a lower portion illustrates the response. The remote client 402 and service 404 are shown as labeled rectangles, as in FIG. 3. A right-pointing solid arrow 406 represents sending of an HTTP request message from a remote client to the service and a left-pointing solid arrow 408 represents sending of a response message corresponding to the request message by the service to the remote client. For clarity and simplicity of illustration, the service 404 is shown associated with a few resources 410-412.

Figure 4A:
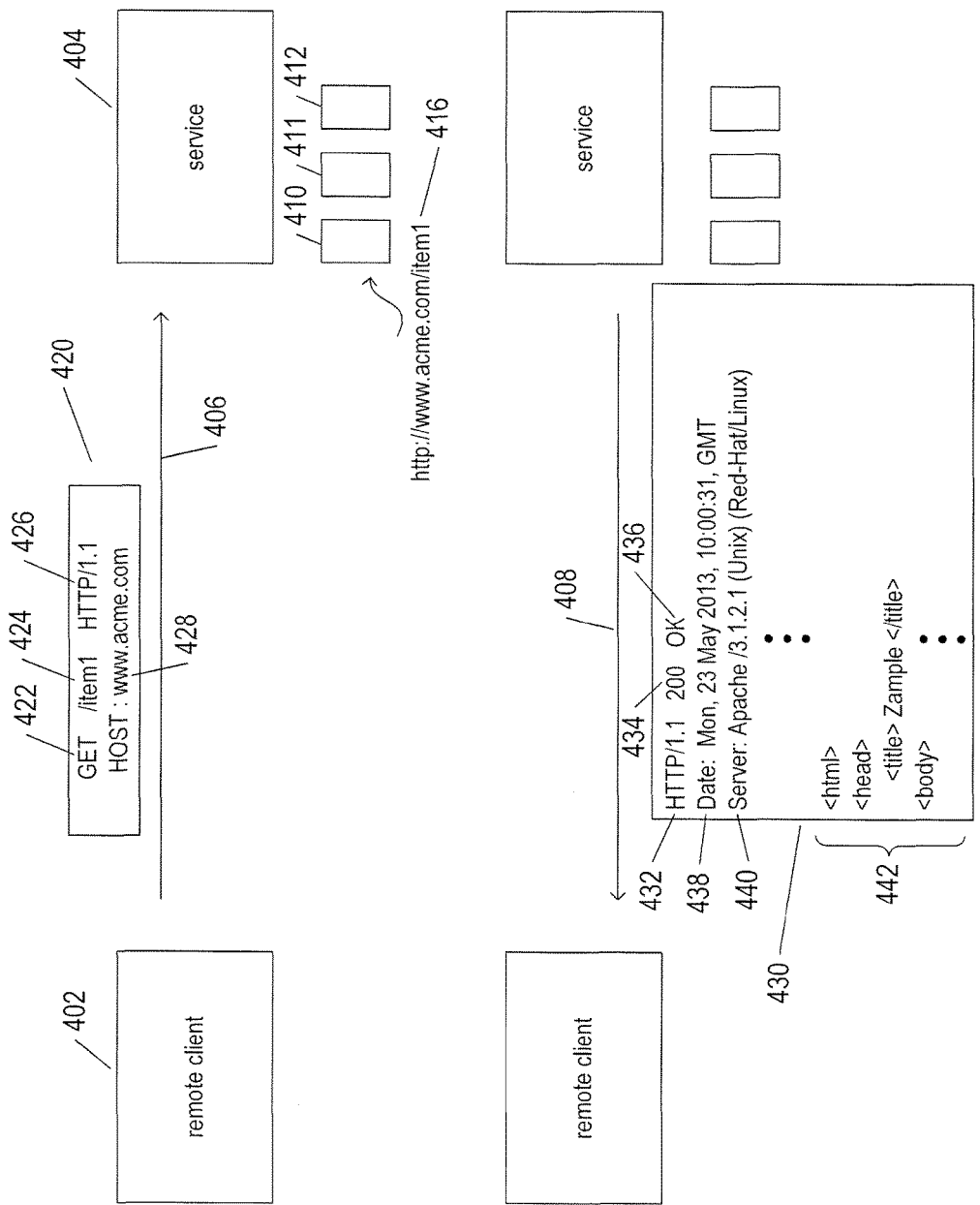
FIGS. 4A-D illustrate four basic verbs, or operations, provided by the HTTP application-layer protocol used in RESTful applications.

FIG. 4A illustrates the GET request and a typical response. The GET request requests the representation of a resource identified by a URI from a service. In the example shown in FIG. 4A, the resource 410 is uniquely identified by the URI "http://www.acme.com/item1" 416. The initial substring "http://www.acme.com" is a domain name that identifies the service. Thus, URI 416 can be thought of as specifying the resource "item1" that is located within and managed by the domain "www.acme.com." The GET request 420 includes the command "GET" 422, a relative resource identifier 424 that, when appended to the domain name, generates the URI that uniquely identifies the resource, and in an indication of the particular underlying application-layer protocol 426. A request message may include one or more headers, or key/value pairs, such as the host header 428 "Host:www.acme.com" that indicates the domain to which the request is directed. There are many different headers that may be included. In addition, a request message may also include a request-message body. The body may be encoded in any of various different self-describing encoding languages, often JSON, XML, or HTML. In the current example, there is no request-message body. The service receives the request message containing the GET command, processes the message, and returns a corresponding response message 430. The response message includes an indication of the application-layer protocol 432, a numeric status 434, a textural status 436, various headers 438 and 440, and, in the current example, a body 442 that includes the HTML encoding of a web page. Again, however, the body may contain any of many different types of information, such as a JSON object that encodes a personnel file, customer description, or order description. GET is the most fundamental and generally most often used verb, or function, of the HTTP protocol.

Figure 4B:
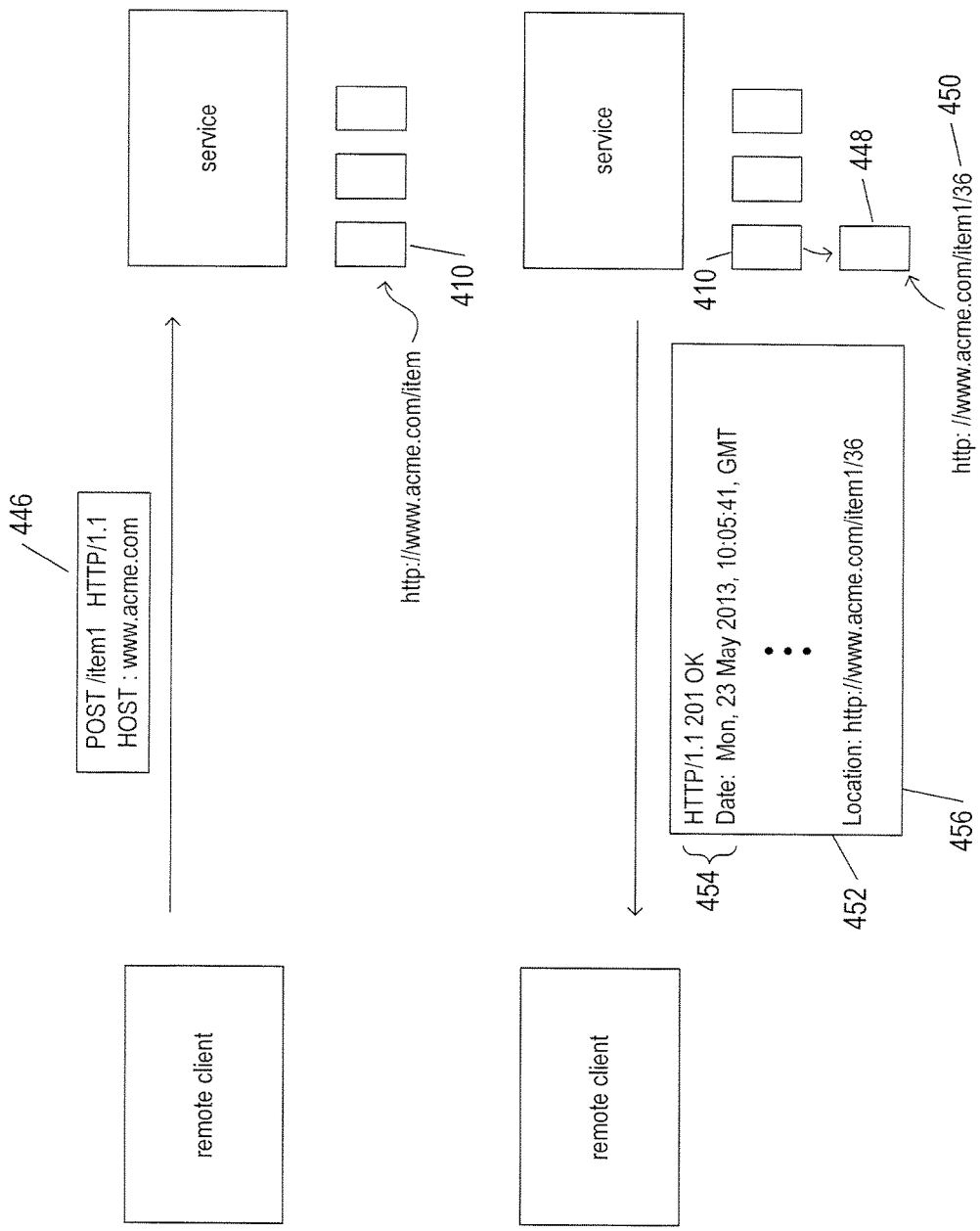

FIG. 4B illustrates the POST HTTP verb. In FIG. 4B, the client sends a POST request 446 to the service that is associated with the URI "http://www.acme.com/item1." In many RESTful APIs, a POST request message requests that the service create a new resource subordinate to the URI associated with the POST request and provide a name and corresponding URI for the newly created resource. Thus, as shown in FIG. 4B, the service creates a new resource 448 subordinate to resource 410 specified by URI "http://www.acme.com/item1," and assigns an identifier "36" to this new resource, creating for the new resource the unique URI "http://www.acme.com/item1/36" 450. The service then transmits a response message 452 corresponding to the POST request back to the remote client. In addition to the application-layer protocol, status, and headers 454, the response message includes a location header 456 with the URI of the newly created resource. According to the HTTP protocol, the POST verb may also be used to update existing resources by including a body with update information. However, RESTful APIs generally use POST for creation of new resources when the names for the new resources are determined by the service. The POST request 446 may include a body containing a representation or partial representation of the resource that may be incorporated into stored information for the resource by the service.

Figure 4C:
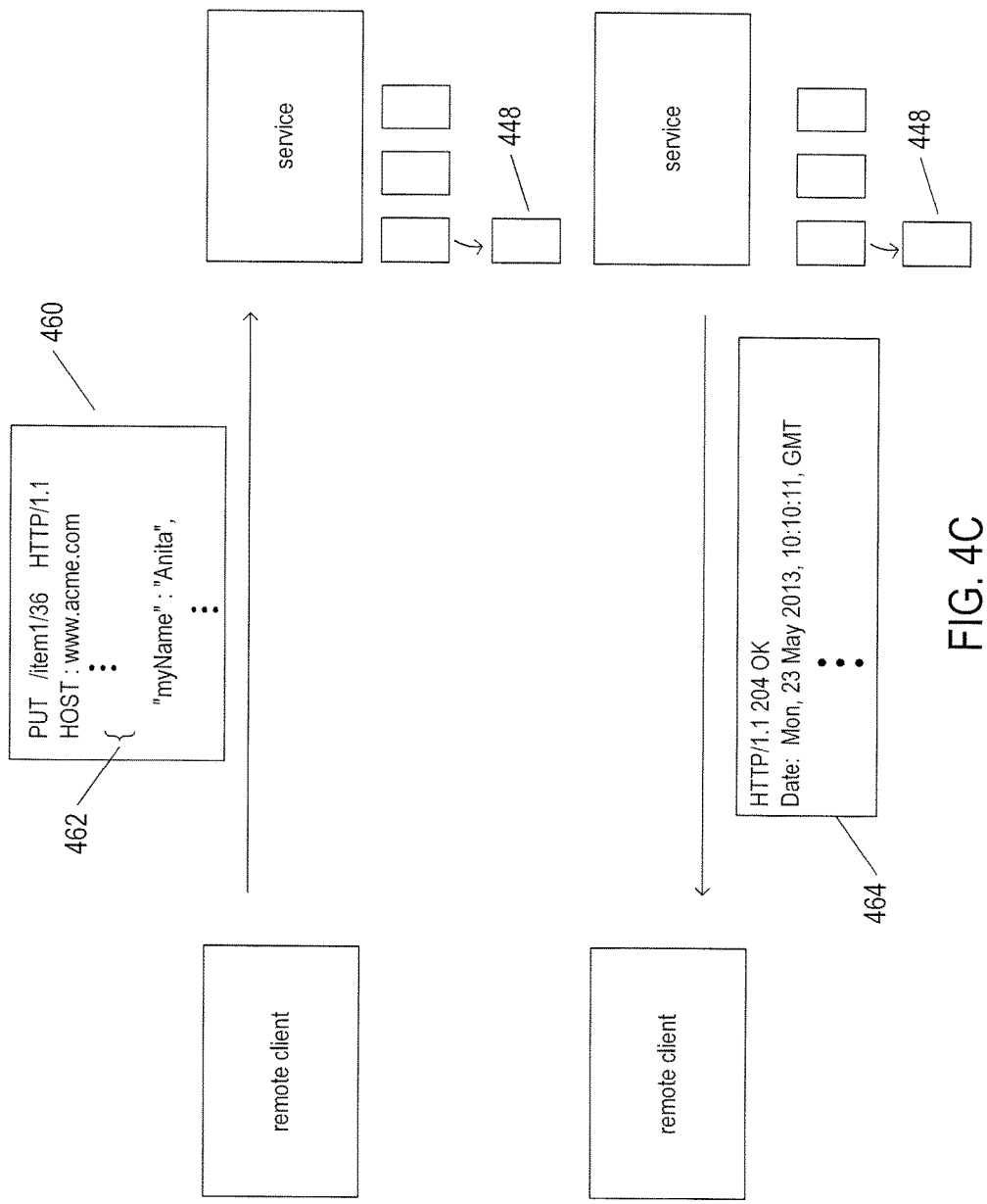

FIG. 4C illustrates the PUT HTTP verb. In RESTful APIs, the PUT HTTP verb is generally used for updating existing resources or for creating new resources when the name for the new resources is determined by the client, rather than the service. In the example shown in FIG. 4C, the remote client issues a PUT HTTP request 460 with respect to the URI "http://www.acme.com/item1/36" that names the newly created resource 448. The PUT request message includes a body with a JSON encoding of a representation or partial representation of the resource 462. In response to receiving this request, the service updates resource 448 to include the information 462 transmitted in the PUT request and then returns a response 464 corresponding to the PUT request 464 to the remote client.

Figure 4D:
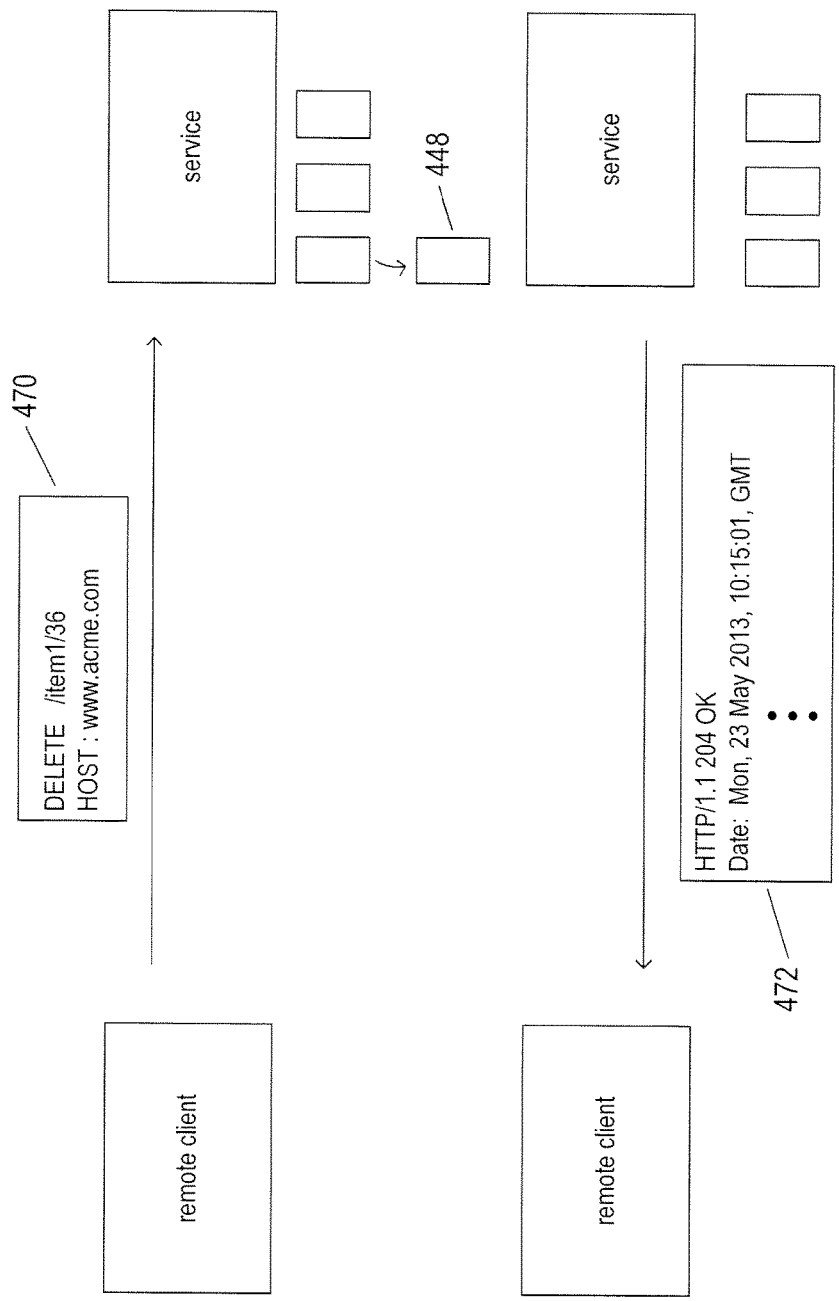

FIG. 4D illustrates the DELETE HTTP verb. In the example shown in FIG. 4D, the remote client transmits a DELETE HTTP request 470 with respect to URI "http://www.acme.com/item1/36" that uniquely specifies newly created resource 448 to the service. In response, the service deletes the resource associated with the URL and returns a response message 472.

As further discussed below, and as mentioned above, a service may return, in response messages, various different links, or URIs, in addition to a resource representation. These links may indicate, to the client, additional resources related in various different ways to the resource specified by the URI associated with the corresponding request message. As one example, when the information returned to a client in response to a request is too large for a single HTTP response message, it may be divided into pages, with the first page returned along with additional links, or URIs, that allow the client to retrieve the remaining pages using additional GET requests. As another example, in response to an initial GET request for the customer info resource (310 in FIG. 3), the service may provide URIs 320 and 336 in addition to a requested representation to the client, using which the client may begin to traverse the hierarchical resource organization in subsequent GET requests.

Returning of hyperlinks, or additional URIs, by a service to a client can also be used to dynamically extend an initial API. FIGS. 5A-B illustrate extension of the simple RESTful API discussed above with reference to FIGS. 3 and 4A-D. FIG. 5A illustrates the hierarchical organization of resources in the initial RESTful API 502. FIG. 5B illustrates an extended RESTful API 504. The extension involves adding an additional set of resources, at the lowest hierarchical level 506, that represent the status of orders. Thus, each order resource, such as order resource 508, is now associated with a corresponding status resource 510. This RESTful API extension may be undertaken by the service or may be undertaken by an appropriately authorized client. However, in either case, once the extension is carried out, the service needs to inform clients unaware that the extension has occurred of the availability of additional information. This can be accomplished by including additional links in responses.

Figure 6:
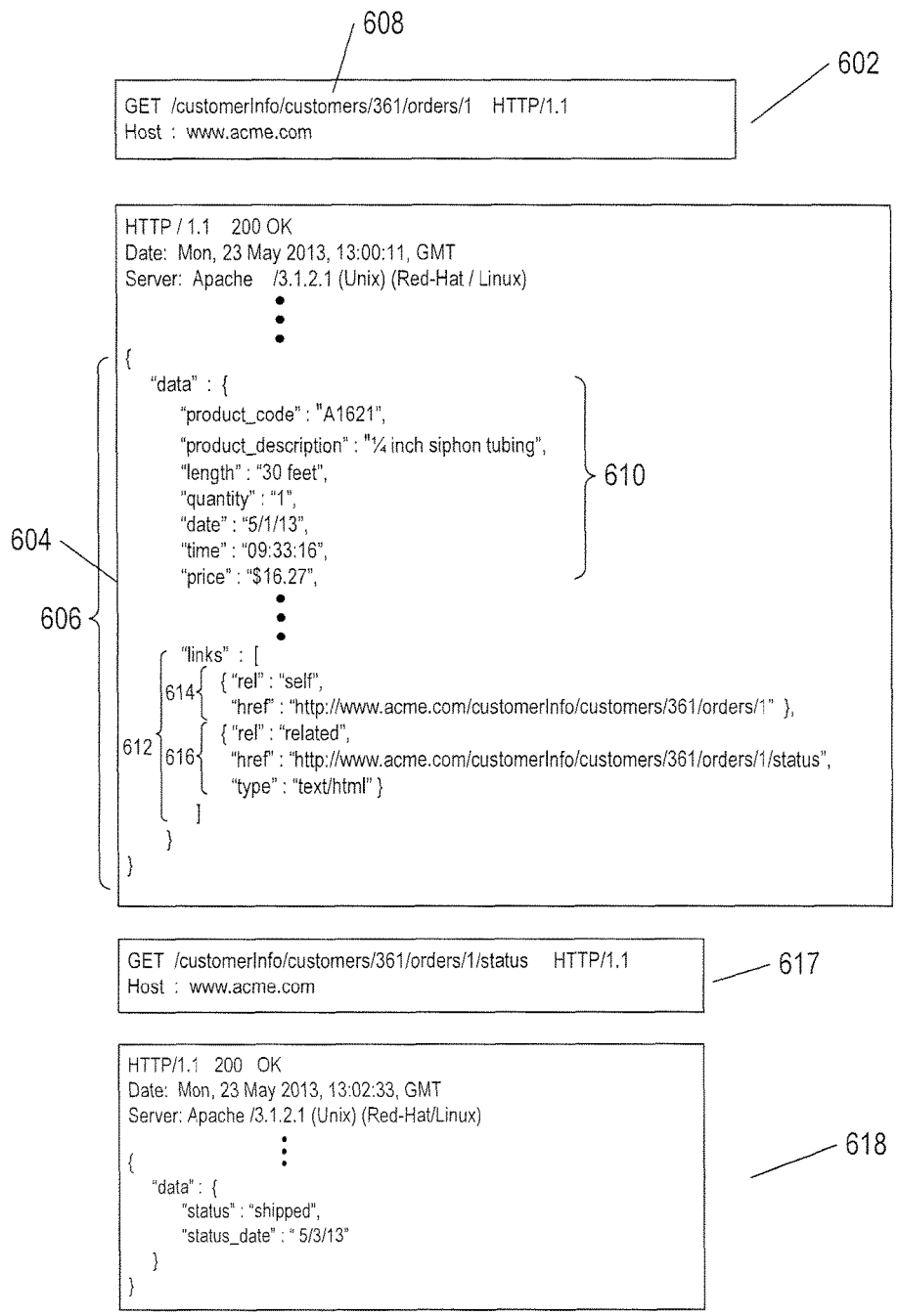
FIG. 6 illustrates the use of additional links and responses in order to inform a client of newly available resources as a result of extension of a restful API.

FIG. 6 illustrates the use of additional links and responses in order to inform a client of newly available resources as a result of extension of a RESTful API. A client unaware of the extension may request information about an order using a GET request 602. In response, the service transmits the response message 604 back to the client. The body of the response message 606 is encoded in JSON. It includes a data object with numerous key/value pairs that describe or provide a representation for the order specified by the URI 608 contained in the GET request. These key/value pairs 610 provide a product code, product description, and other such information. In addition, the data object includes a links object 612 that includes several links 614 and 616. The first link 614 is a self link, referring back to the original URI 608 included in the GET request. The second link 616 is a related link to the self link and is the URI for the new status resource associated with the order specified by the URI 608. Using this link, the client can then submit a second GET request 617 to the service in order to obtain the status information for the order, which is returned in a second response message 618 by the service. Thus, the use of additional links, or hyperlinks, in the body of responses to GET requests can inform clients of RESTful API extensions. A server can add any of many different types of additional links to facilitate extension of APIs and to facilitate navigation, via subsequent GET requests, carried out by clients as they traverse the hierarchically organized resources available through the API.

Figure 7A:
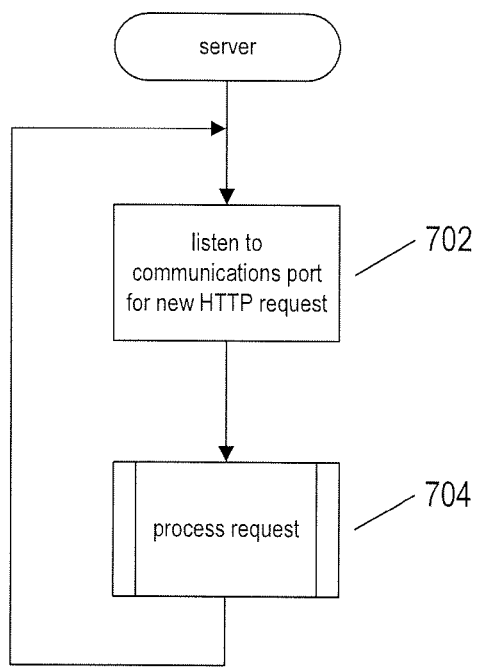
FIGS. 7A-C illustrate the type of functionality present within a server that handles requests, including GET requests from clients.
Figure 7B:
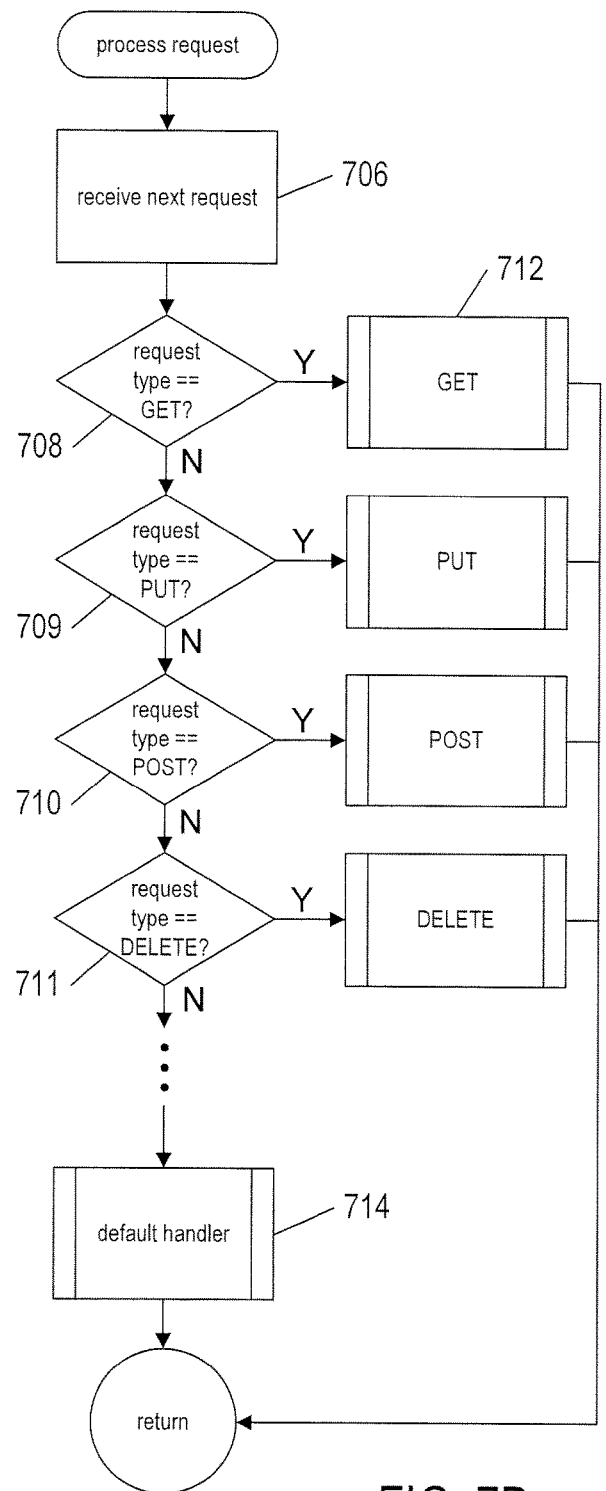
Figure 7C:
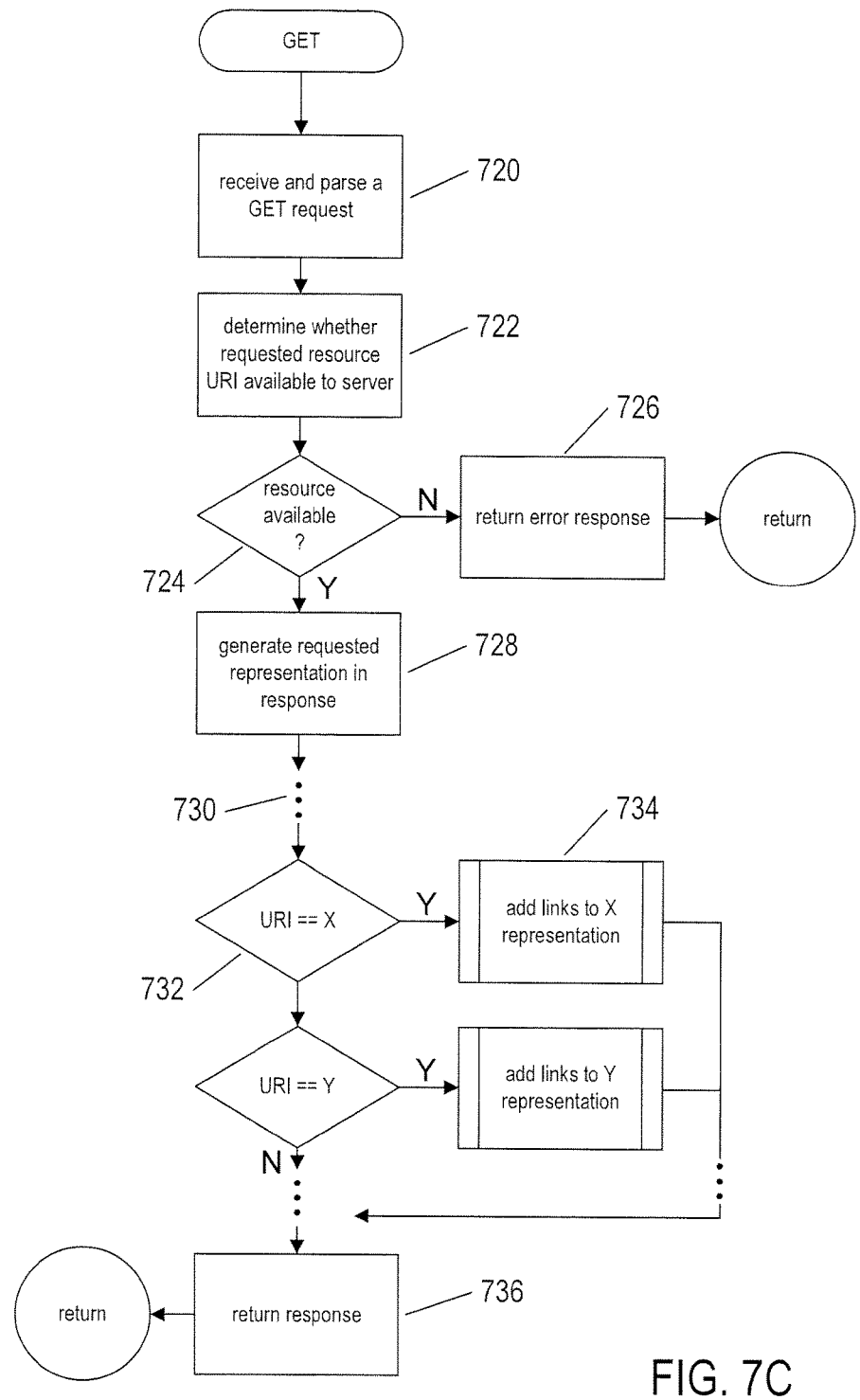

FIGS. 7A-C illustrate the type of functionality present within a server that handles requests, including GET requests from clients. FIG. 7A illustrates a listener process within a server that receives HTTP requests through a communications port provided by a protocol stack, such as the protocol stack 230 shown in FIG. 2. A server may employ numerous listener processes to listen for HTTP requests through one or more ports and dispatch the requests for servicing. In FIG. 7A, the process listens to a communications port for a new HTTP request, in step 702 and, when a request becomes available, processes the request in step 704 by calling a routine "process request." The processing may be undertaken by the listener process or by another process notified by the listener process to dequeue the next request from a memory queue.

FIG. 7B illustrates the "process request" routine called in step 704 in FIG. 7A. The request is received, either as a reference or as a result of dequeuing the process from a memory queue, by the routine "processRequest" in step 706. Then, in a series of conditional steps, including steps 708-711, the routine determines, in a sequence of conditional steps, whether or not the type of request is one of a number of different HTTP request types and, upon determining the request type is equal to a particular request type, calls an appropriate routine to handle the request. For example, when the request type is GET, as determined in step 708, then the routine "processRequest" calls a "GET" routine, in step 712, to process the GET request. The routine "processRequest" may additionally include a default handler, shown as step 714 in FIG. 7B, when the routine fails to determine the type of request or encounters any of various errors.

FIG. 7C illustrates a partial implementation of the "GET" routine called in step 712 of FIG. 7B. In step 720, the routine "GET" receives and parses a GET request provided to the routine via a reference or copy argument. In step 722, the routine "GET" determines whether or not the requested resource, specified by the URI included in the GET request, is available. When, as determined in step 724, the resource is not available, the "GET" routine, in step 726, prepares and returns an error response to the requesting client. Otherwise, in step 728, the routine "GET" generates a representation of the requested resource within a response message corresponding to the GET request. Ellipses 730 indicate that additional steps may be executed in order to process a GET request and complete the corresponding response message. In the case that the initial API has been extended, as discussed above with reference to FIGS. 5A-B and 6, the "GET" routine may undertake the addition of links to the response message. As shown in FIG. 7C, as an example, the "GET" routine includes additional conditional steps, such as conditional step 732, in which the "GET" routine determines whether or not the URI of the requested resource is equal to a particular value, with the particular values indicated by symbols "X" and "Y" in FIG. 7C, and, when the URI is equal to the particular URI, the "GET" routine then adds one or more links to the response message appropriate for a GET request that has requested the representation of the particular resource. For example, in FIG. 7C, when the URI for the requested resource equals a value X, as determined in step 732, the "GET" routine calls an additional routine in step 734 to add one or more links to the response message appropriate for a GET request directed to the URI. Thus, in the example of FIGS. 5A-B, a GET request for a particular order may result in a call to a routine to add a link to the status resource associated with the order to the response message. Finally, in step 736, a completed response message is returned by the routine "GET."

As can be appreciated from the high-level control-flow diagram 7A-C, in the approach illustrated in these figures, the server bears a rather significant processing burden with respect to the extension of an API. Extension of the API based on the resources shown in FIG. 5A, for example, to the resources shown in FIG. 5B may require significant specialized control logic, such as a series of conditionals and routine calls similar to step 732 and 734 in FIG. 7C, in order to provide links to the new status resources in response messages corresponding to GET requests for orders. Should the server wish to add additional links to GET requests for the collection of orders, then even greater computational and development burdens would ensue. Although it may be possible to write somewhat more generic logic for handling the simple extension illustrated in FIGS. 5A-B, the somewhat more generic logic would still require significant development efforts. For a more complex API featuring significantly more types of resources and more resources of particular types, the computational and development burdens may become significant and even prohibitive. Were clients to extend the API, through PUT requests, then an even more complex distributed effort would be needed to enable clients to alter server logic for processing requests and adding additional related links to request responses.

Figure 8A:
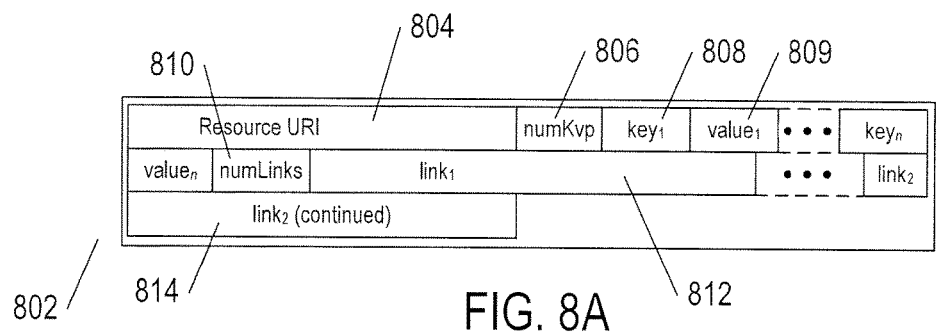
FIGS. 8A-B illustrate an example link registry.
Figure 8B:
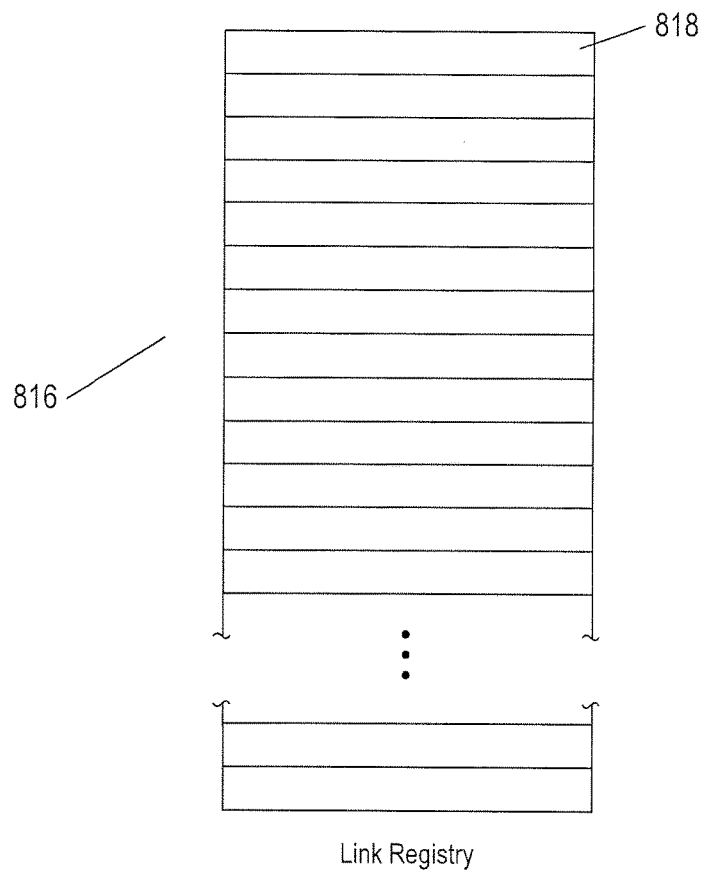

The current document is directed to a new approach to extending RESTful APIs without incurring significant computational and development overheads, as discussed above with reference to FIG. 7C. The approach to which the current document is directed uses a link registry. The link registry is a collection of link-registry entries, each of which represents additional links added to response messages corresponding to request messages directed to a particular resource. FIGS. 8A-B illustrate an example link registry. FIG. 8A illustrates one implementation of a link-registry entry. The link-registry entry 802 is a variable-length record that includes numerous fields. In example link-registry entry 802, these fields include: (1) ResourceURI 804, a field containing a symbol-string representation of the URI to which a request message may be directed; (2) numKvp 806, the number of key/value pairs that follow this field; (3) a number of key/value field pairs 808-809 equal to the value in the field numKvp 806, the key value pairs representing various types of conditions or constraints with respect to returning additional links, further discussed below; (4) numLinks 810, a field indicating the number of links that follow this field; and (5) a number of link fields, such as fields 812 and 814, equal to the value stored in the numLinks field 810, each link field storing a representation of a link to be added to the response message, such as the related link 616 in FIG. 6. Note that each link may include multiple key/value pairs, such as the three key/value pairs included in link 616.

FIG. 8B illustrates the link registry. The link registry is a set of links 816, with each cell in the column array 816, such as cell 818, representing a link-registry entry, such as link-registry entry 802 shown in FIG. 8A. The link registry may be implemented in many different ways. For example, the link entries maybe rows in a relational database table that is stored and managed by a relational database management system. Alternatively, the link-registry entries may be stored in files associated with various types of indexes to allow for efficient location of particular link-registry entries. The link-registry entries may also be sorted with respect to the values of one or more of the fields.

A link-registry entry may be represented in JSON. FIG. 9 illustrates a JSON encoding of a particular link-registry entry. Key/value pairs are used, in the JSON representation, to represent the various fields and values stored in the fields. For example, the Resource URI field (804 in FIG. 8) is represented by key "ResourceURI" 902 and a particular symbol-string representation of a particular URI 904. Similarly, the numKvp field (806 in FIG. 8A) is represented by key 906 and value 908.

Figure 10:
FIG. 10 shows example method calls to a simple link-registry API.

In one implementation, the link registry is made accessible via a simple link-registry API, which is a subset of the RESTful customer information API discussed above with reference to FIGS. 3-5B. FIG. 10 shows example method calls to a simple link-registry API. The link registry is associated with a URI 1002. The link registry can be accessed using the GET, PUT, POST, and DELETE HTTP methods. Examples 1004 are provided in FIG. 10. The GET request 1006 can be used to obtain a representation of the entire link registry, including representations of all of the link-registry entries. GET request 1008 may be used to find a link-registry entry corresponding to the collective customers resource. PUT request 1010 can be used to store or update the link-registry entry for the customers collective resource, with the link-registry entry represented by symbol string "LinkRegistryEntry" 1012. The link-registry entry corresponding to the collective customers resource can be deleted using the DELETE request 1014. The link-registry entry corresponding to a particular customer can be retrieved using GET request 1016.

The key/value pairs contained in a link-registry entry provides a mechanism for directing additional links to response messages with particular characteristics. For example, because resources are often hierarchically organized, it may be desirable, in certain cases, for additional links to be added with respect to an intermediate-level resource in the path of a lower-level resource. In other words, as shown in FIG. 9, when the value of the resource URI field is "http://www.acme.com/customerInfo/customers," the creator of the link-registry entry may desire for the additional link specified in the link-registry entry to be added in a response message to a request for a representation of the resource "http://www.acme.com/customerInfo/customers/361/orders/1." On the other hand, the author of the link-registry entry may wish for the additional links only to be added when a representation of the specific resource "http://www.acme.com/customerInfo/customers" is requested in a request message. In one scheme, illustrated in FIG. 9, the key "appliedTo" 910 may be associated with either the value "terminal" or "non-terminal." When the value is "terminal," then the specified additional links are added only when the URI in the request message exactly matches the URI in the field "ResourceURI" of the link-registry entry. However, when the value is "non-terminal," then a requested URI that contains the value of the "Resource URI" field as an initial substring should be responded to with a response message that contains the additional links. Other key/value pairs may indicate that the additional link should only be added for response messages containing particular values and/or for request messages containing particular values. In the example shown in FIG. 9, the two key/value pairs 912 specify that the additional link 914 should be included in a response message only when the body of the response message contains the key/value pairs city/Des Moines and state/Iowa. In alternative implementations, a link-registry entry may omit the numKvp and kvp keys and associated values and simply add additional links into the response message corresponding to a request message requesting a representation of a resource specified by a URI that exactly matches the value of the "ResourceURI" field of the link-registry entry. In yet alternative implementations, many different types of additional filtering and selection specifiers may be included in a link-registry entry, including range specifiers, relational operators, and other features common to, for example, relational database queries.

Figure 11A:
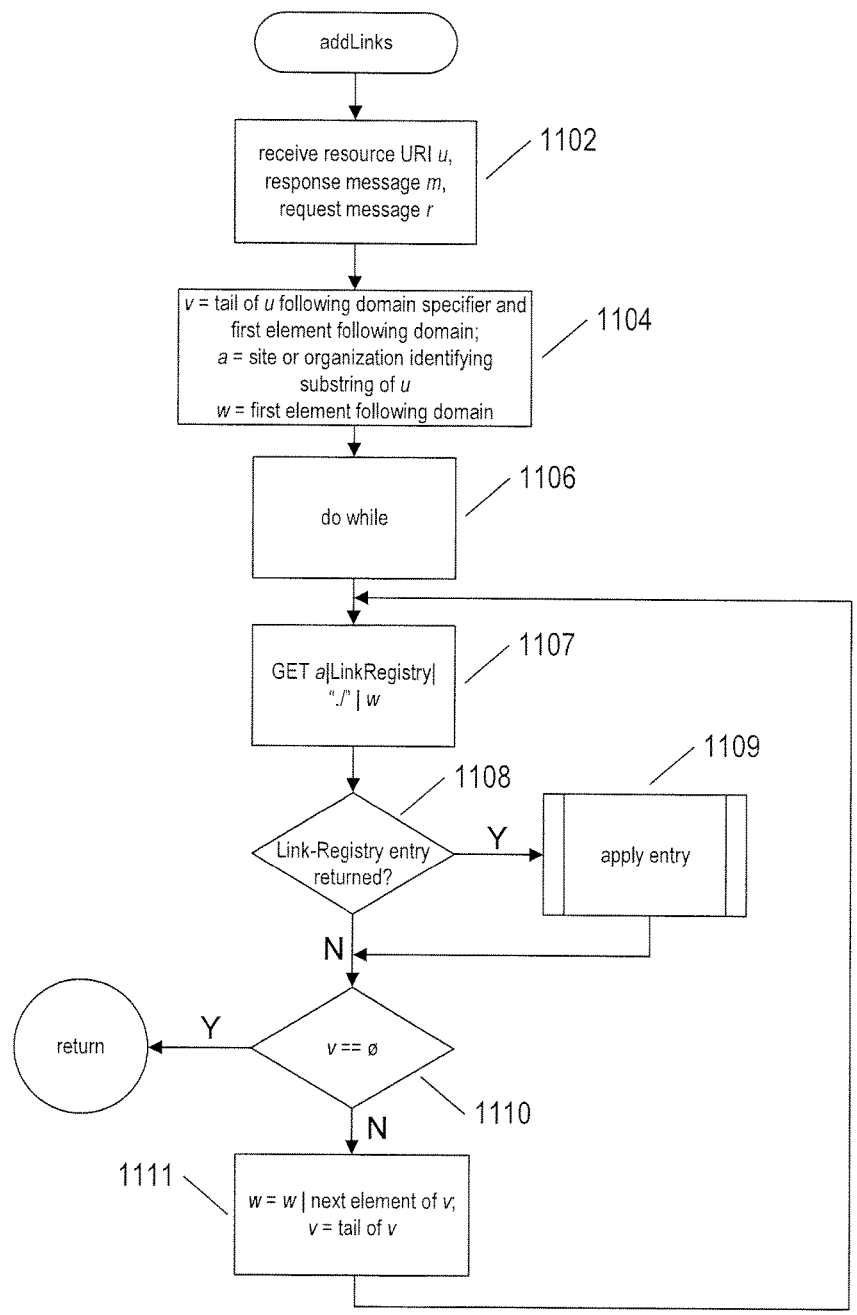
FIGS. 11A-B provide control-flow diagrams that illustrate an "addLinks" routine that may be employed by a server to query the link registry during the processing of a request message and construction of a corresponding response message in order to add additional links, when appropriate.
Figure 11B:
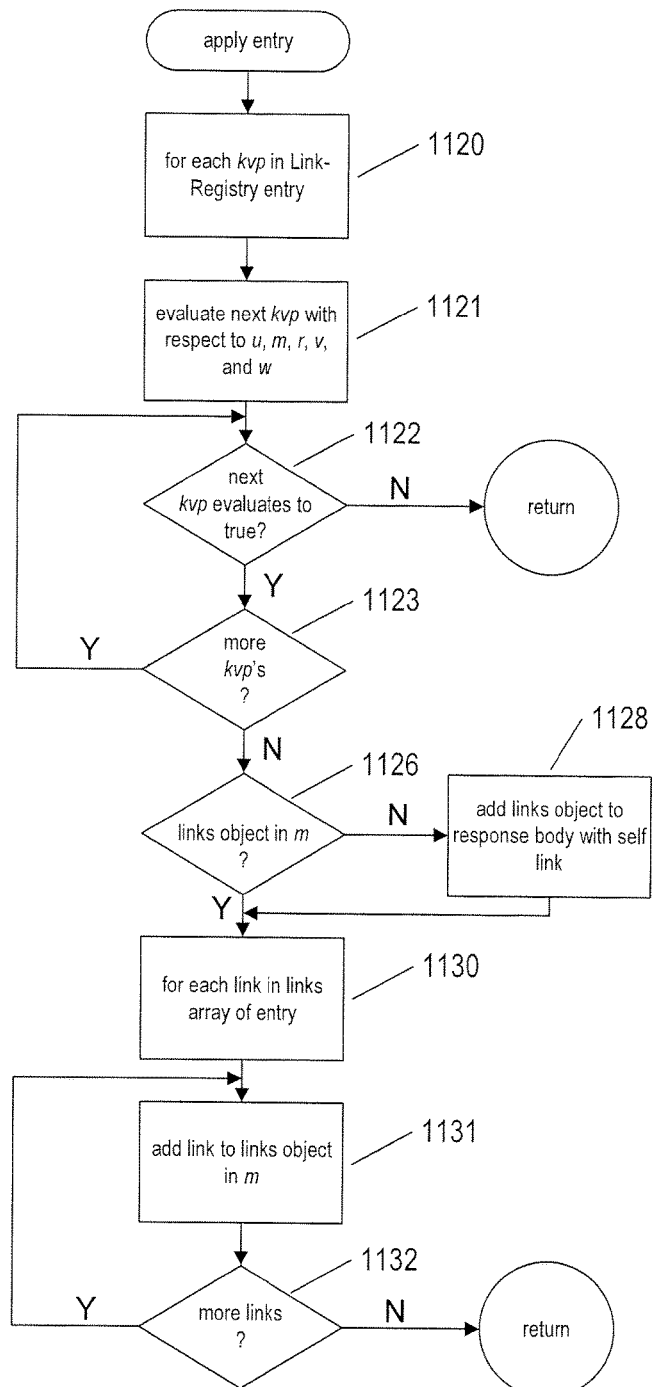

FIGS. 11A-B provide control-flow diagrams that illustrate an "addLinks" routine that may be employed by a server to query the link registry during the processing of a request message and construction of a corresponding response message in order to add additional links, when appropriate. FIG. 11A provides a control-flow diagram for the top level of the "addLinks" routine. In step 1102, the "addLinks" routine receives a resource URI u, a response message m, and a request message r. These may be references to the resource URI, response message, and request message or copies of the resource URI, response message, or request message, depending on the implementation. In step 1104, the routine "addLinks" sets a local variable v to be the tail of the resource URI u following the domain specifier and first element after the domain specifier, sets local variable a to be the domain specifier substring of u, and sets a local variable w to be the first element of the resource URI following the initial domain specifier. For example, for the resource URI "http://www.acme.com/customerInfo/customers," v is set to "/customers," a is set to "http://www.acme.com," and w is set to "/customerinfo." Note that for simplicity of description, the "/" symbols within URIs are assumed to be managed, during concatenation operations, to produce properly "/"-deliminated URI symbol strings. Next, in the do-while loop of steps 1106-1111, the routine "addLinks" gets any link-registry entry corresponding to a URI composed of the domain substring to which the current value of the w local variable is appended, in step 1107. When a link-registry entry is returned, as determined in step 1108, then the routine "applyEntry" is called in step 1109 to add any additional links specified by the link-registry entry to a response message m corresponding to a request message r that contained a request for representation of the resource URI u. When local variable v is now the null string, as determined in step 1110, the routine "addLinks" returns. Otherwise, the next element in v is appended to w and v is assigned to be the tail of v, in step 1111, following which control flows back to the beginning of the do-while loop. In other words, the routine "addLinks" searches the link registry for all entries corresponding to either the full resource URI or for intermediate resource URIs contained within the full resource URL.

FIG. 11B provides a control-flow diagram for the routine "applyEntry" called in step 1109 of FIG. 11A. In a first for-loop of steps 1120-1123, the routine "applyEntry" evaluates each key/value pair in the kvp array of the link-registry entry with respect to the original resource URI u, the response message m, the original request message r, and the current values of v and w. When this next key/value pair evaluates to TRUE, as determined in step 1122, the for-loop continues. Otherwise, the routine "applyEntry" returns. Thus, the initial for-loop of steps 1120-1123 carries out a filtering and selection of the response message and associated information to determine whether or not to add the additional links contained in the link-registry entry to the response message. As discussed above, in alternative implementations, rather than simply insisting that all key/value pairs evaluate to TRUE, a more complex query-processing operation may be applied, with range values, relational operators, and other such features of query processing to evaluate whether or not to add additional links in the link-registry entry. In these implementations, it is possible that the link registry may contain multiple entries for a given URI, with the entries containing different key/value filtering and selection specifiers and/or different additional links. In this case, the do-while loop of steps 1106-1111 in FIG. 11A would contain an additional inner loop, following the access of the link registry in step 1107, in order to process potentially multiple link-registry entries returned by the access.

Next, in step 1126, the routine "applyEntry" determines whether there is already a links object in the response message m in which the additional links can be added. If not, then, in step 1128, a links object is added to the body of the response message containing a self link. Of course, this is implementation-dependent, and other vehicles and schemes for adding additional links may be employed in alternative implementations. Finally, in the for-loop of steps 1130-1132, the additional links specified within the link-registry entry or entries are added to the response message.

Figure 12:
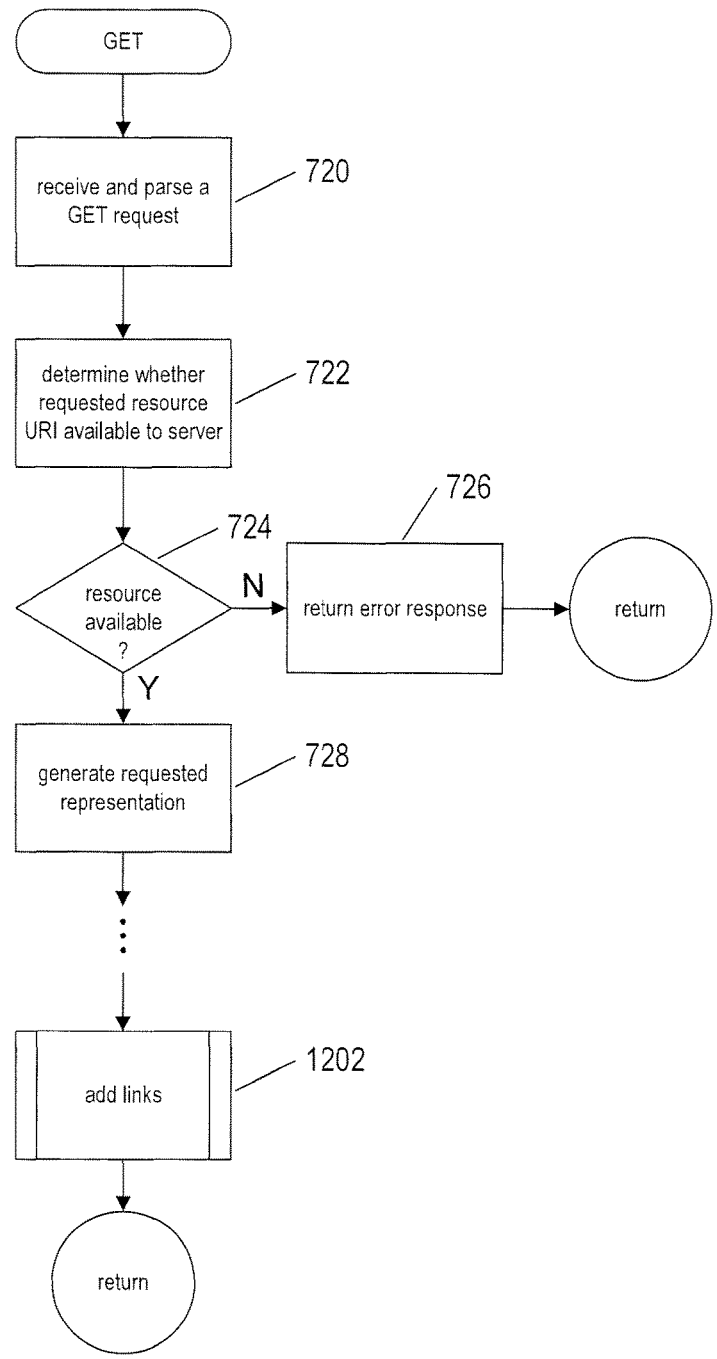
FIG. 12 illustrates, using an alternative version of the routine "GET" first illustrated in FIG. 7C, use of the routine "addLinks" described above with reference to FIGS. 11A-B.

FIG. 12 illustrates, using an alternative version of the routine "GET" first illustrated in FIG. 7C, use of the routine "addLinks" described above with reference to FIGS. 11A-B. The initial steps of the routine "GET" illustrated in FIG. 12 are identical to those in the version of the routine shown in FIG. 7C. However, rather than including a potentially large amount of specialized logic, such as step 732 and 734 in FIG. 7C, for the addition of links to response messages, the implementation of the routine "GET" shown in FIG. 12 simply calls the routine "addLinks" in step 1202. Thus, the additional of links to response messages is entirely driven by the link registry and relatively simple logic for finding link-registry entries corresponding to a particular resource URI and processing those entries in order to add the additional links, as discussed above with reference to FIGS. 11A-B.

Although the present invention has been described in teens of particular embodiments, it is not intended that the invention be limited to these embodiments. Modifications within the spirit of the invention will be apparent to those skilled in the art. For example, a links registry and links-registry-associated logic for adding additional links to response messages in order to extend RESTful APIs can be implemented in many different ways by varying any of many different design and implementation parameters, including choice of operating system, virtualization layer, programming language, control structures, data structures, modular organization, and other such design and implementation parameters. As discussed above, link-registry entries can be as simple as consisting of a resource URI and an associated link to add to any response message corresponding to a request message that includes the resource URI or may include various filtering and selection criteria as well as multiple links, as discussed above with reference to FIGS. 8A and 9. The link registry may be created and maintained within a server computer or may be created and maintained within a different, remote server accessible to the server computer and, in certain implementations, to clients of the server computer.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. A link registry comprising:
    a link-registry application programming interface;
    a set of one or more link-registry entries, stored in a physical data-storage device or medium, that each includes one or more hyperlinks to add to response messages returned in response to request messages that represent a method applied to a resource or resources specified by one of a resource identifier and a representation of a resource identifier that is also included in the link-registry entry; and
    a control component that is invoked, by a call to the link-registry application programming interface by a processor-controlled device, during processing of a request message by the processor-controlled device, to add hyperlinks encoded in link-registry entries to a corresponding response message.

2. The link registry of claim 1 wherein the control component adds hyperlinks encoded in link-registry entries to the corresponding response message by:
    identifying one or more link-registry entries that are applicable to the request message and corresponding response message; and
    adding hyperlinks encoded in the identified one or more link-registry entries to the corresponding response message.

3. The link registry of claim 1 wherein the control component identifies one or more link-registry entries that are applicable to the request message and corresponding response message as those link-registry entries containing the resource identifier that occurs in the request message.

4. The link registry of claim 1 wherein the control component identifies one or more link-registry entries that are applicable to the request message and corresponding response message as those link-registry entries containing a resource identifier that occurs as a substring within the representation of a resource identifier that occurs in the request message.

5. The link registry of claim 1 wherein the control component identifies one or more link-registry entries that are applicable to the request message and corresponding response message as those link-registry entries containing the resource identifier that occurs in the request message or that occurs as a substring within the representation of a resource identifier that occurs in the request message.

6. The link registry of claim 1 wherein each link-registry entry additionally includes applicability criteria.

7. The link registry of claim 6 wherein the control component identifies a link-registry entry as being applicable to the request message and corresponding response message as a link-registry entry that contains a resource identifier that occurs in the request message and that includes either no applicability criteria or that contains applicability criteria that, when applied to the request message and response message, identify the link-registry entry as being applicable to the request message and corresponding response message.

8. The link registry of claim 6 wherein the control component identifies a link-registry entry as being applicable to the request message and corresponding response message as a link-registry entry that contains a resource identifier that occurs as a substring within the representation of a resource identifier that occurs in the request message and that includes either no applicability criteria or that contains applicability criteria that, when applied to the request message and response message, identify the link-registry entry as being applicable to the request message and corresponding response message.

9. The link registry of claim 6 wherein the control component identifies a link-registry entry as being applicable to the request message and corresponding response message as a link-registry entry that contains a resource identifier that occurs in the request message or that occurs as a substring within the representation of a resource identifier that occurs in the request message and that includes either no applicability criteria or that contains applicability criteria that, when applied to the request message and response message, identify the link-registry entry as being applicable to the request message and corresponding response message.

10. The link registry of claim 6 wherein the applicability criteria include one or more key/value pairs that each refers to fields and values contained in fields of the request message and corresponding response message.

11. The link registry of claim 1 wherein the link-registry application programming interface includes a set of verbs and resources that allow an entity that accesses the link registry to add link-registry entries to the link registry, modify link-registry entries in the link registry, and delete link-registry entries from the link registry.

* * * * *